(12) United States Patent
Blanco et al.

(10) Patent No.: US 10,783,443 B2
(45) Date of Patent: *Sep. 22, 2020

(54) REAL-TIME ANALYSIS OF PREDICTIVE AUDIENCE FEEDBACK DURING CONTENT CREATION

(71) Applicant: INTERNATIONAL BUSINESS MACHINES CORPORATION, Armonk, NY (US)

(72) Inventors: Yenny B. Blanco, Dublin (IE); Petras Butkus, Westmeath (IE); Liam Harpur, Dublin (IE); Francesco Mariani, Mulhuddart (IE); Larissa A. Silveira, Clonee (IE); Nagesh Yadav, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 691 days.

This patent is subject to a terminal disclaimer.

(21) Appl. No.: 15/453,835

(22) Filed: Mar. 8, 2017

(65) Prior Publication Data

US 2018/0260724 A1 Sep. 13, 2018

(51) Int. Cl.
*G06N 7/00* (2006.01)
*G06F 16/435* (2019.01)
(Continued)

(52) U.S. Cl.
CPC .......... *G06N 7/005* (2013.01); *G06F 16/435* (2019.01); *G06N 20/00* (2019.01); *G06Q 30/02* (2013.01); *G06Q 50/01* (2013.01)

(58) Field of Classification Search
CPC .......... G06N 3/08; G06N 20/00; G06N 7/005; G06F 16/435; G06Q 30/02; G06Q 50/01
See application file for complete search history.

(56) References Cited

U.S. PATENT DOCUMENTS 5,761,662 A 6/1998 Dasan
9,077,458 B2 7/2015 Burger et al.
(Continued)

OTHER PUBLICATIONS

IBM, List of IBM Patents or Patent Applications Treated as Related, Appendix P, dated Feb. 5, 2018, 2 pages.
(Continued)

*Primary Examiner* — Eric Nilsson
(74) *Attorney, Agent, or Firm* — John Noh

(57) ABSTRACT

Providing predictive feedback during content creation in real-time. A server computer receives from a user-computing device an electronic document during creation of the electronic document in real-time. An intended audience specification is also received by the server computer for the received electronic document. The server computer calculates a similarity score for a plurality of viewer profiles. The server computer determines which viewer profiles have similarity score equal to or exceeding the similarity score threshold and then stores the determined viewer profiles. An individual interest level and an individual emotional response is calculated for the determined viewer profiles for a portion of the received electronic document. The server computer then transmits to the user-computing device the individual interest level and the individual emotional response of the determined viewer profiles.

13 Claims, 9 Drawing Sheets

(51) Int. Cl.
*G06Q 50/00* (2012.01)
*G06Q 30/02* (2012.01)
*G06N 20/00* (2019.01)

(56) References Cited

U.S. PATENT DOCUMENTS

| | | | |
|---|---|---|---|
| 9,323,331 | B2 | 4/2016 | Cardonha et al. |
| 9,336,268 | B1* | 5/2016 | Moudy .................. G06F 16/244 |
| 2007/0150916 | A1 | 6/2007 | Begole et al. |
| 2008/0091512 | A1 | 4/2008 | Marci et al. |
| 2009/0083129 | A1 | 3/2009 | Pradeep et al. |
| 2010/0211439 | A1 | 8/2010 | Marci et al. |
| 2012/0072289 | A1 | 3/2012 | Pradeep et al. |
| 2012/0290508 | A1 | 11/2012 | Bist |
| 2014/0052682 | A1 | 2/2014 | Phan et al. |
| 2014/0091897 | A1* | 4/2014 | Lemmey ................. A61B 5/165 340/3.1 |
| 2014/0122622 | A1* | 5/2014 | Castera .................. H04L 51/04 709/206 |
| 2014/0223462 | A1 | 8/2014 | Aimone et al. |
| 2015/0193889 | A1* | 7/2015 | Garg .................. G06Q 30/0251 705/14.49 |
| 2015/0296239 | A1 | 10/2015 | Burger et al. |
| 2015/0338918 | A1 | 11/2015 | Cardonha et al. |
| 2017/0026470 | A1 | 1/2017 | Bhargava et al. |

OTHER PUBLICATIONS

Pending U.S. Appl. No. 15/617,050, filed Jun. 8, 2017, entitled: "Real-Time Analysis of Predictive Audience Feedback During Content Creation", 39 pages.

Pending U.S. Appl. No. 15/885,974, filed Feb. 1, 2018, entitled: "Real-Time Analysis of Predictive Audience Feedback During Content Creation", 39 pages.

IBM, List of IBM Patents or Patent Applications Treated as Related, Appendix P, dated Jun. 9, 2017, 2 pages.

Pending U.S. Appl. No. 15/617,050, filed Jun. 8, 2017, entitled: "Real-Time Analysis of Predictive Audience Feedback During Content Creation".

Ryoo et al., "The Emotion Prediction Model Based on Audience Behavior", IEEE, 2013, 3 pages.

Mell et al., "The NIST Definition of Cloud Computing", National Institute of Standards and Technology, Special Publication 800-145, Sep. 2011, pp. 1-7.

* cited by examiner

REAL-TIME ANALYSIS OF PREDICTIVE AUDIENCE FEEDBACK DURING CONTENT CREATION

BACKGROUND

The present invention relates generally to the field of electronic analysis of digital content, and more particularly to digital ascertainment of predictive audience feedback in real-time during content creation.

BRIEF SUMMARY

Embodiments of the present invention disclose a method, system, and computer program product for providing predictive feedback during content creation in real-time. A server computer receives from a user-computing device an electronic document during creation of the electronic document in real-time. An intended audience specification is also received by the server computer for the received electronic document. The server computer calculates a similarity score for a plurality of viewer profiles. The server computer determines which viewer profiles have similarity score equal to or exceeding the similarity score threshold and then stores the determined viewer profiles. An individual interest level and an individual emotional response is calculated for the determined viewer profiles for a portion of the received electronic document. The server computer then transmits to the user-computing device the individual interest level and the individual emotional response of the determined viewer profiles.

DETAILED DESCRIPTION

Digital content, such as a seminar session, book, presentation, video, movie, song, speech, or the like are not equally engaging to a diverse audience of people. Each consumer of digital content, based on his or her personal interests might find one section of digital content more interesting than others. Presented is a method, system, and computer program product to analyze digital content as it is generated in real-time based on emotional and physiological responses of consumers of digital content, and present predictive feedback and various options to an author of the digital content in real-time, in order to automatically improve or facilitate improvement of the digital content, also in real-time.

"Digital content" (or "content") is described with reference to this patent application as an "electronic document" and is typically, in fundamental nature, text, video, audio, multimedia, still image, or some combination of these, embodied as digital data. Such electronic documents are created by an author, also referred to herein as a "user." By means of non-limiting example, such electronic document may be a text file, a Word file, a pdf format file, an mpeg file, an avi file, a gif file, a jpeg file, a bmp file, a ppt file, a mov file, or any other presently existing or after-arising file format allowing the transmission of text, video, audio, still image, or other information as is understood by one of skill in the art, in accordance with embodiments of the invention. After-arising equivalents are specifically contemplated. Electronic documents, as discussed further below, are created with an intention of presentation to a target audience.

A "viewer profile" as discussed with reference to this patent application is a simulated electronic profile of a real individual which is used by the presently disclosed invention to generate feedback in real-time regarding each electronic document, upon request. Viewer profiles are stored, in a preferred embodiment, in an object or class of a programming language, as those terms are understood to one in skill in the art, but in alternate embodiments are stored in any sort of program, data structure, database entry, matrix, array, spreadsheet, or any other computer accessible form, in accordance with embodiments of the invention. Each viewer profile is modeled upon a real individual, and associated with the real demographic data of the individual it is modeled upon. Such demographic data may include by non-limiting example age, gender, education level, field of study, occupation, marital status, income, place of birth, place of residence, or any other demographic data point regarding the individual. Viewer profiles, their creation, and their use are further discussed below.

Figure 1:
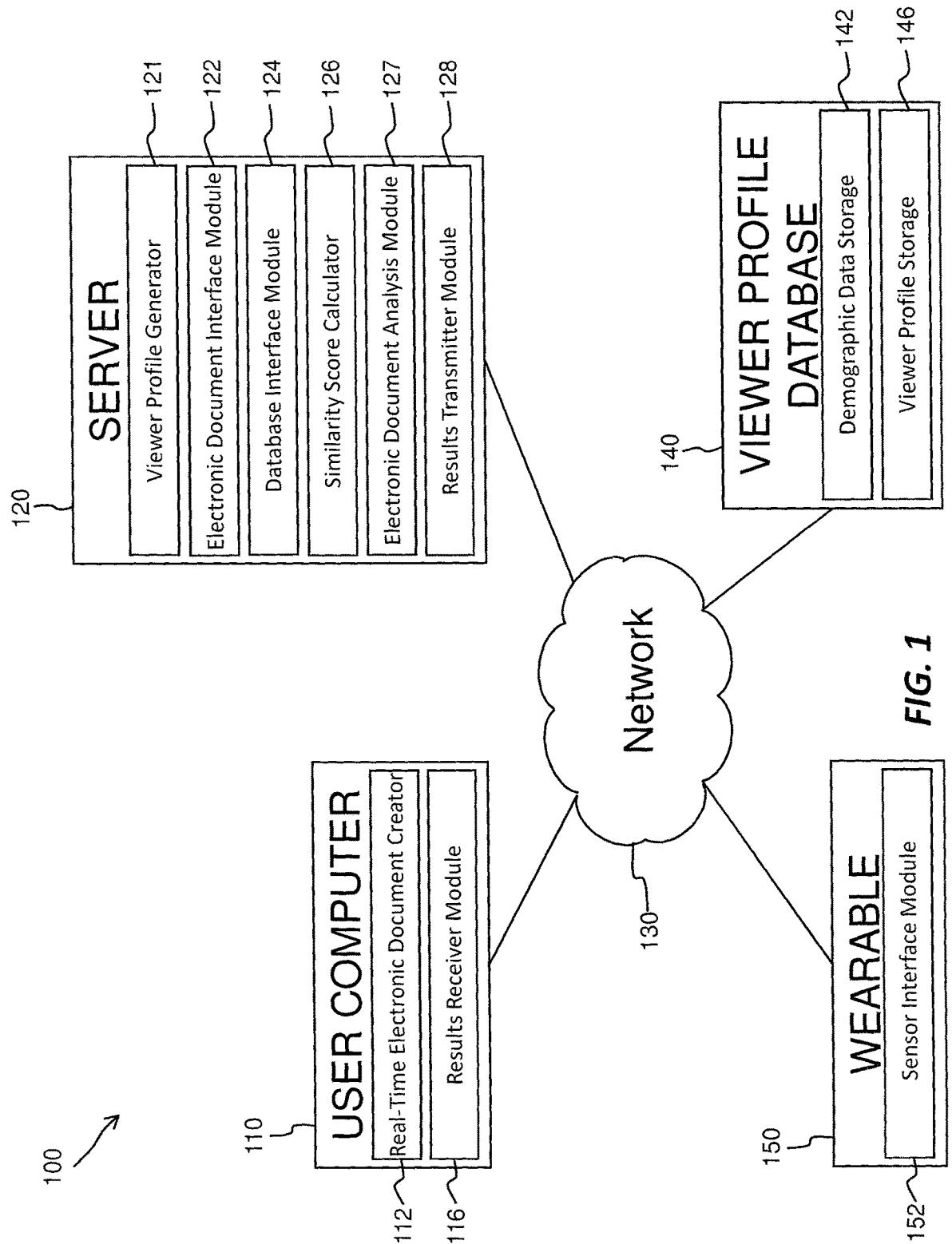
FIG. 1 is a functional block diagram illustrating an environment for real-time analysis of predictive audience feedback during content creation, in accordance with an embodiment of the present invention.

FIG. 1 is a functional block diagram illustrating an environment for real-time analysis of predictive audience feedback during content creation 100, in accordance with an embodiment of the present invention. In an exemplary embodiment, included in the environment 100 is a user computer 110 (or "user-computing device"), a server 120 (or "server computer"), a viewer profile database 140, and at least one wearable sensor 150, all interconnected via a network 130.

In various embodiments, network 130 represents, for example, an intranet, a local area network (LAN), a wide area network (WAN) such as the Internet, and includes wired, wireless, or fiber optic connections. In general, network 130 can be any combination of connections and protocols that will support communications between user computer 110, server 120, viewer profile database 140, and wearable sensor 150, in accordance with an embodiment of the invention.

In various embodiments, each of user computer 110, server 120, and viewer profile database 140 may be, for example, a mainframe or a mini computer, a laptop, a tablet, a netbook personal computer (PC), a mobile device, or a desktop computer, or any sort of computing platform possessing sufficient processing power to perform the required functionality in accordance with the embodiment. Each of user computer 110, server 120, and viewer profile database 140 may include internal and external hardware components as depicted and described in further detail below with reference to FIG. 7, below. Viewer profile database 140 represents one or more computer databases allowing storage and access to various computer data and files upon request, as discussed further herein. In other embodiments, each of user computer 110, server 120, and viewer profile database 140 may be implemented in a cloud computing environment, as described in relation to FIGS. 8 and 9, below.

User computer 110 represents any sort of computing platform possessing sufficient processing power to execute software to be utilized in authoring one or more electronic documents and perform the other tasks as further described herein. In an exemplary embodiment, user computer 110 includes a real-time electronic document creator 112 and a results receiver module 116.

Real-time electronic document creator 112 represents software appropriate to create, edit, and transmit during creation (i.e., in "real-time"), text, video, audio, multimedia, or still images as electronic documents, as would be understood by one of skill in the art. In various embodiments, application specific proprietary software may be used, but also proprietary and open source word-processing software with customized plug-ins, presentation software with appropriate plug-ins, audio recording software, video recording software, a music synthesizer, or any other appropriate software to create and edit electronic documents may be utilized, in accordance with embodiments of the invention. After-arising software is specifically contemplated.

The electronic document is (as discussed previously) simply digital content. The electronic document is created for the purpose of entertaining, informing, educating, warning, etc. the target audience. The electronic document may be, for example, text, video, audio, multimedia, or still images. In order for the electronic document to have the desired effect of entertaining, informing, educating, warning, etc. the intended audience, the intended audience must both remain interested in the content and/or the intended emotional state must be generated in the audience. For example, if the electronic document is intended to entertain an audience, the audience must remain interested and happy. If the electronic document is intended solely to educate the audience, they must remain interested, at least. If the electronic document is intended to scare an audience, such as a horror movie or a driver's education video the audience should remain interested as well as surprised or afraid. Functionality of the presently disclosed invention provides these desired effect(s) via providing of predictive audience feedback during content creation.

Real-time electronic document creator 112, when transmitting the electronic document, also transmits both an intended audience specification and a similarity score threshold from the user computer 110, for generation of customized feedback with regard to the electronic document. The intended audience specification is a value or series of values allowing selecting of characteristics of an audience of viewer profiles for viewing and responding to the electronic document. The characteristics of the intended audience may include, for example, the age, gender, education level, income, field of study, occupation, marital status, place of birth, place of residence, citizenship, etc. or any other audience characteristics that may be useful in obtaining an intended audience. The similarity score threshold is also a value, allowing limiting of the audience of viewer profiles to those sharing a certain level of calculated similarity to the intended audience specification, according to characteristics known about individuals the viewer profiles are based upon. The similarity score threshold may be within a range, for example, of 0.0 and 1.0, or a range of 0 and 100, with a higher value within the range typically indicating a closer match. In alternate embodiments the similarity score threshold is preset at some value, such as 0.75. The real-time electronic document creator 112 also provides functionality for transmission of the intended audience specification and the similarity score threshold to the server 120 for use, as is discussed further below, in connection with FIG. 2.

Results receiver module 116 allows the receipt of feedback, generated by the server 120 as described in more detail below, at user computer 110, for review, such as via a simple pop-up window or a graphics user interface.

Server 120 represents a network computing platform which possesses sufficient computing power to host workload 96 of FIG. 9 below. Server 120 includes a viewer profile generator 121, an electronic document interface module 122, a database interface module 124, a similarity score calculator 126, an electronic document analysis module 127, and a results transmitter module 128. As described in more detail below, the server 120 is involved in the process of generation of viewer profiles, which are used as discussed further below. In addition to generation of viewer profiles, the server 120 performs the function of receiving the electronic document and audience settings, accesses a database to obtain the viewer profiles, simulates the audience's reaction, and returns the results to the user computer 110.

Viewer profile generator 121 provides functionality by which viewer profiles are generated based upon demographic data and data obtained from presenting sample content to individuals. Viewer profiles, as discussed herein, simulate real individuals and are utilized to gauge what each individual's reaction would be to the electronic document, and to generate simulated feedback regarding an electronic document (known herein as "predictive feedback"), in order to allow real-time improvements. Viewer profiles are stored in the viewer profile database 140 after generation. In an embodiment of the invention, generation of viewer profiles utilizes at least one wearable sensor 150, which is further discussed in connection with FIG. 3. In an alternate embodiment of the invention, generation of viewer profiles involves responses to electronic or other survey data by the real individuals, after being presented sample content. The generation of viewer profiles, their storage in viewer profile database 140, as well as their use is discussed further above and below.

The electronic document interface module 122 receives the electronic document in real-time from the user computer 110 as it is created by using the real-time electronic document creator 112.

The database interface module 124 accesses a plurality of previously-generated viewer profiles stored in viewer profile database 140. Each previously-generated viewer profile simulates an individual viewer with certain characteristics and, when utilized by the presently disclosed invention, provides predictive feedback regarding the electronic document. The full definition of a "viewer profile" within the context of this patent application is provided above, and further discussed below.

The similarity score calculator 126 calculates a similarity score for each viewer of the plurality of viewer profiles to the intended audience specification received from the real-time electronic document creator 112. The similarity score is a calculated estimate of similarity between the intended audience specification received from the real-time electronic document creator 112 for each of the viewer profiles in the viewer profile database 140. It is calculated individually for each viewer profile. This process is discussed further in connection with Figure. 4. The similarity scores calculated for each of the plurality of viewer profiles are stored for later use.

The similarity score calculator 126 then performs the further step of comparing each similarity score for each of the plurality of viewer profiles and determining which are similar enough to be utilized. The determined user profiles are stored into memory associated with the server 120 for further use. In an embodiment, a determination is made which viewer profiles equal or exceed the similarity score threshold, and storing these determined viewer profiles into memory associated with the server 120 for further use. The determined viewer profiles are then used as further discussed below, especially as shown in connection with FIG. 4. This serves to limit viewer profiles from being utilized for providing of predictive feedback if they are very different from the intended audience specification received.

The electronic document analysis module 127 analyzes a portion of the received electronic document and calculates an individual interest level and an individual emotional response for each of the determined viewer profiles. Each determined viewer profile's calculated individual interest level and individual emotional response references exclusively the portion of the received electronic document that is being analyzed. The individual interest level calculated for each determined viewer profile indicates a level of interest a viewer profile is likely to express regarding the portion of the received document analyzed. The individual emotional response level calculated for each determined viewer profile indicates an emotional response anticipated for the analyzed portion of the electronic document. As is further discussed below, portions of the electronic document are analyzed separately by the server 120 in real-time. If the electronic document is text, it may be analyzed, for example, on a sentence by sentence basis, by paragraph, or by page. If the electronic document is primarily audio or video in nature, it may be analyzed by segments of some predetermined length, such as five seconds, ten seconds, fifteen seconds, thirty seconds, one minute, five minutes, ten minutes, etc. This process is further discussed in connection with FIG. 4.

In a further embodiment, the electronic document analysis module 127 further serves to weight the individual interest level and individual emotional response of the determined viewer profiles according to the similarity score and then aggregate and rank the determined viewer profiles according to viewer similarity score (with the individual interest level and individual emotional response of each determined profile ranked more strongly if the similarity score is high, and less strongly if the similarity score is low).

The results transmitter module 128 transmits the individual interest level and individual emotional response of the determined viewer profiles to the user computer 110 via the results receiver module 116, such as by presentation of a graphics user interface on the user computer 110. In addition, or in lieu of this step, the results transmitter module 128 of the server 120 serves to automatically modify the portion of the received electronic document to improve individual interest level and individual emotional response. The server 120 may, for example, automatically alter objectionable language in a text document or automatically "bleep" out offensive words in an audio, video, or multimedia document to improve individual interest level and individual emotional response. Less commonly used words, such as "lift" or "biscuit," if a British electronic document is being analyzed may be automatically altered to the American English equivalent. Automatic translations may also occur, if necessary. Alternately, if objectionable images are an issue, the server 120 may automatically obscure the footage to improve individual interest level and individual emotional response. This is further discussed below in connection with FIG. 6.

Viewer profile database 140 makes available demographic data and computer files related to the generation and storage of viewer profiles. The viewer profile database 140 includes demographic data storage 142 and viewer profile storage 146.

Demographic data storage 142 provides demographic data for a plurality of individuals which may be used in generating viewer profiles to provide feedback on electronic documents. Demographic data maintained for each individual may include age, gender, education level, field of study, occupation, marital status, income, place of birth, place of residence, or any other. Any combination of demographic data may be used in generation of each viewer profile, and then associated with each viewer profile. The demographic data may be stored locally or remotely to the viewer profile database 140, or even available via webcrawler or some other automated means of scanning the internet. The uses of demographic data in the creation and use of viewer profiles is discussed further above and below. Demographic data for each individual may be stored anonymously or aggregated in some way to maintain compliance with various laws regarding privacy of data.

Viewer profile storage 146 is used for storing and accessing the viewer profiles after they are created by the viewer profile generator 121.

In certain embodiments, one or more wearable sensors 150 may provide for physical collection of physiological and emotional data from individuals when presenting sample digital content to individuals for generation of viewer profiles. The one or more wearable sensors 150 may include sensors for blood pressure, heart rate, respiration, skin conductivity, eye movement, accelerometers, brain wave sensors, or any other. Collection of data from individuals occurs during presentation of sample digital content to the individuals to generate viewer profiles. The one or more wearable sensors 150 are optional components of the present invention, and in alternate embodiments surveys presented to individuals take their place in generating viewer profiles, as further discussed herein.

Figure 2:
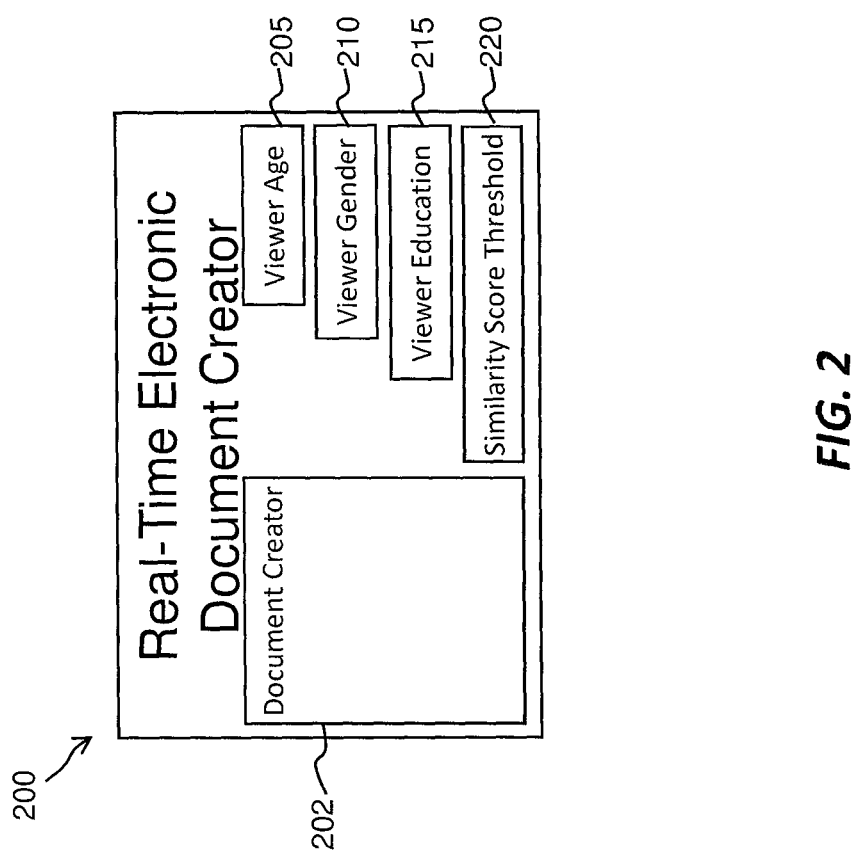
FIG. 2 is simulated real-time electronic document creator, in accordance with an embodiment of the present invention.

FIG. 2 is a simulated real-time electronic document creator 200, in accordance with an embodiment of the present invention. A document is created by the user accessing a document creator interface 202. When accessing the user real-time electronic document creator 200, several choices are presented in specifying the intended audience. In this embodiment, the user may specify viewer age 205, viewer gender 210, viewer education level 215, as well as the similarity score threshold 220. When the server 120 utilizes the similarity score calculator 126 to calculate a similarity score for each of the viewer profiles, the similarity score utilized, by exemplary example, may be based solely upon the age, gender, and education level associated with each viewer profile. In alternate embodiments, other choices are presented as well in the alternate in specifying the intended audience for obtaining of viewer profiles.

Figure 3:
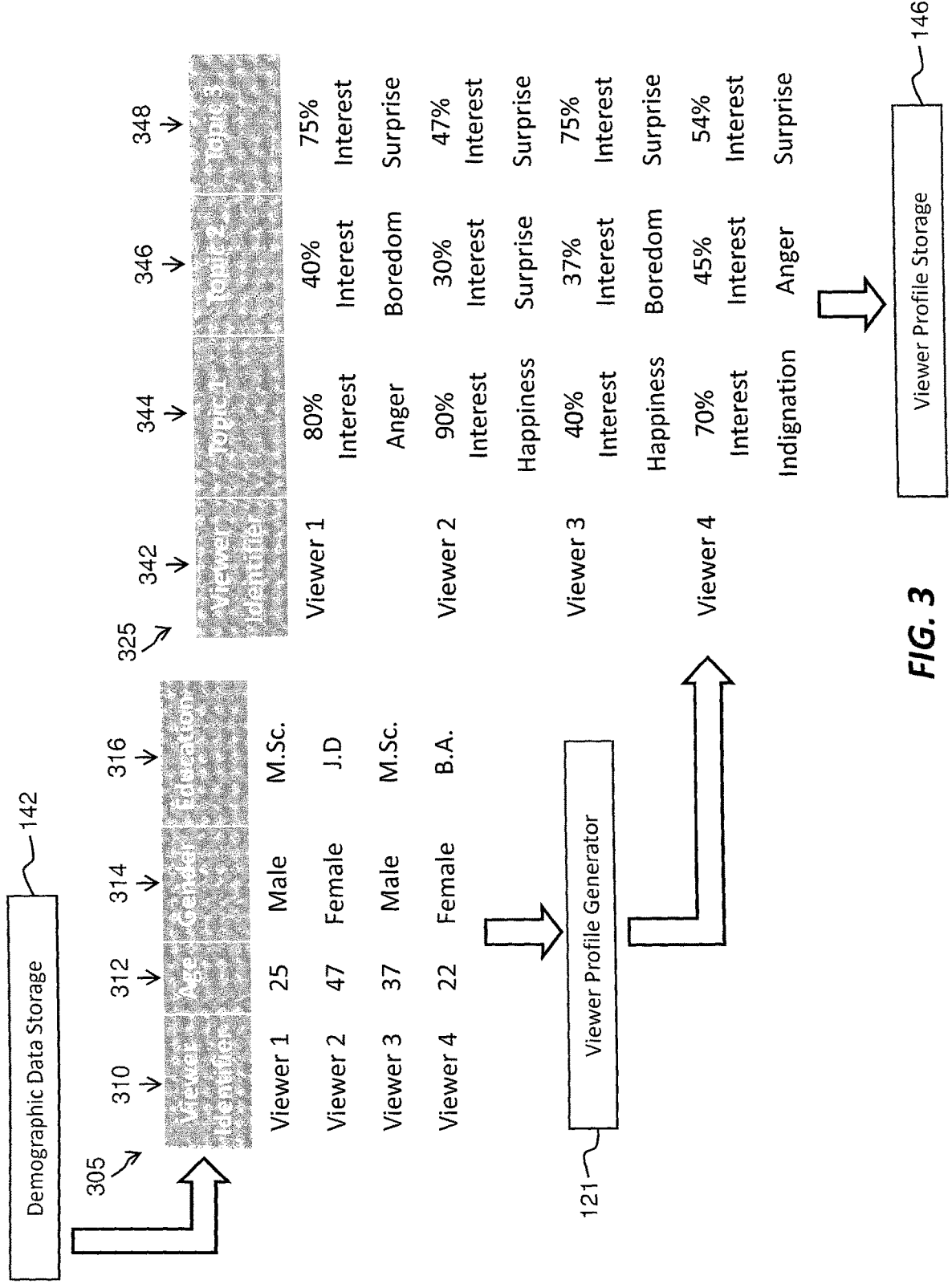
FIG. 3 is a process flow diagram showing generation of viewer profiles, in accordance with an embodiment of the present invention.

FIG. 3 is a process flow diagram showing generation of viewer profiles, in accordance with an embodiment of the present invention. Demographic data storage 142 at the viewer profile database 140 is accessed by the server 120 to obtain demographic data regarding a plurality of individuals. The demographic data regarding the plurality of individuals is displayed in table format 305 for viewing ease. Data points in table 305 include an anonymous viewer identifier 310 (maintained anonymously to ensure compliance with various laws and regulations regarding data privacy, should any exist), viewer age 312, viewer gender 314, and viewer's highest education level obtained 316. The viewer profile generator 121 of the server 120 is then used to generate viewer profiles, again displayed in table format 325. Anonymous user identifiers 342 are again used, as displayed in table 325. After presenting sample digital content regarding various sample topic 1 344, sample topic 2 346, and sample topic 3 348, individual interest level and individual emotional response are tracked for each individual. If audio content is to be assessed, sample topic 1 344 may be, for example, electronic music, sample topic 2 346 may be hip hop music, and sample topic 3 348 may be rap. If video content is to be assessed, sample topic 1 344 may be, for example, horror content, sample topic 2 346 may be thriller content, and sample topic 3 348 may be action content. The newly generated viewer profiles are stored in viewer profile storage 146 in the viewer profile database 140 for later use. Demographic data is also maintained for each viewer profile for later use (not shown here), such uses including calculation of similarity scores between the intended audience specification and each viewer profile.

Figure 4:
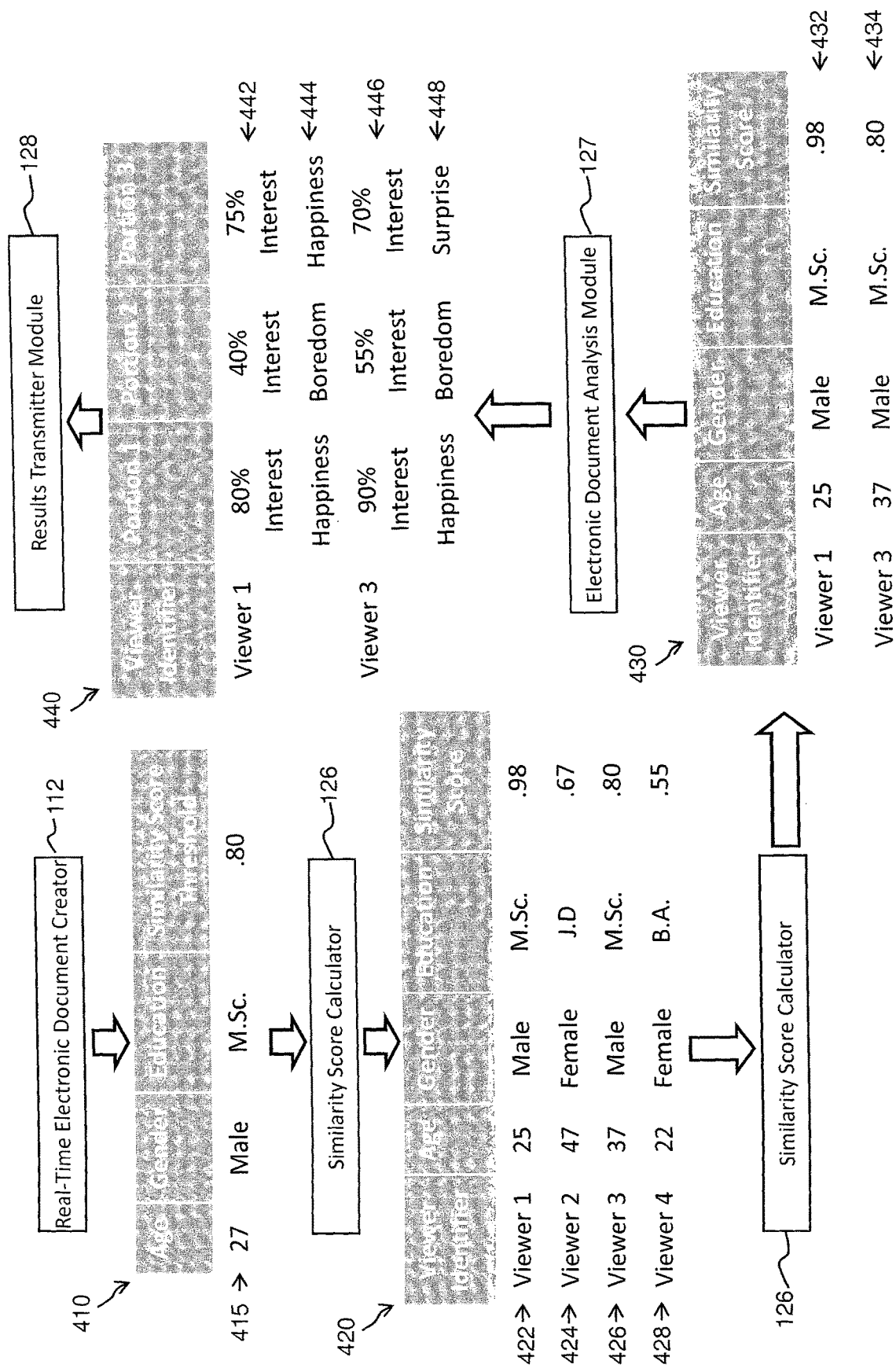
FIG. 4 is a process flow diagram showing providing individual interest levels and individual emotional responses, in accordance with an embodiment of the present invention.

FIG. 4 is a process flow diagram showing providing individual interest levels and individual emotional responses to the results receiver module 116 of the user computer 110, in accordance with an embodiment of the present invention. The user computer 110 provides via the real-time electronic document creator 112 the intended audience specification and similarity score threshold 410, here again displayed in table format for reading ease. Age, gender, education, and similarity score threshold are entered 415. The user computer 110 requests viewer profiles having an age of 27, male, having a Master of Science degree, and specifies similarity score threshold 0.80, as is displayed 415, for the providing of predictive feedback.

The similarity score calculator 126 is then utilized to calculate similarity scores for a plurality of viewer profiles. Four are displayed but in practice more or less may be utilized. As displayed 422, viewer profile 1 is aged 25, male, and also has a Master of Science degree, and is calculated to have a similarity score of 0.98. Viewer profile 2, as displayed 424, is aged 47, female, has a Juris Doctorate degree, and has a similarity score of 0.67. Viewer profile 3, as displayed 426, is aged 37, male, and has a Master of Sciences degree to have a calculated similarity score of 0.80. Viewer profile 4, displayed 428, is aged 22, female, has a Bachelor of Arts degree, and has a calculated similarity score of 0.55. The similarity score calculator 126 then performs the further function of removing from consideration potential viewer profiles with similarity score less than the similarity score threshold of 0.80, the output of which is shown as table 430. Only viewer profile 1 (displayed 432) and viewer profile 3 (displayed 434) are determined to as having similarity scores equaling or exceeding the similarity score threshold remain to provide predictive feedback. The electronic document analysis module 127 utilizes these determined viewer profiles to review portions of an electronic document transmitted in real-time 440. The individual interest level 442, 446 is calculated for each viewer profile's anticipated interest in each portion of the received document, as well as each viewer profile's anticipated emotional response to each portion of the received document 444, 448. The results are transmitted to the user computer 110 via the results transmitter module 128, or utilized for further execution.

Figure 5:
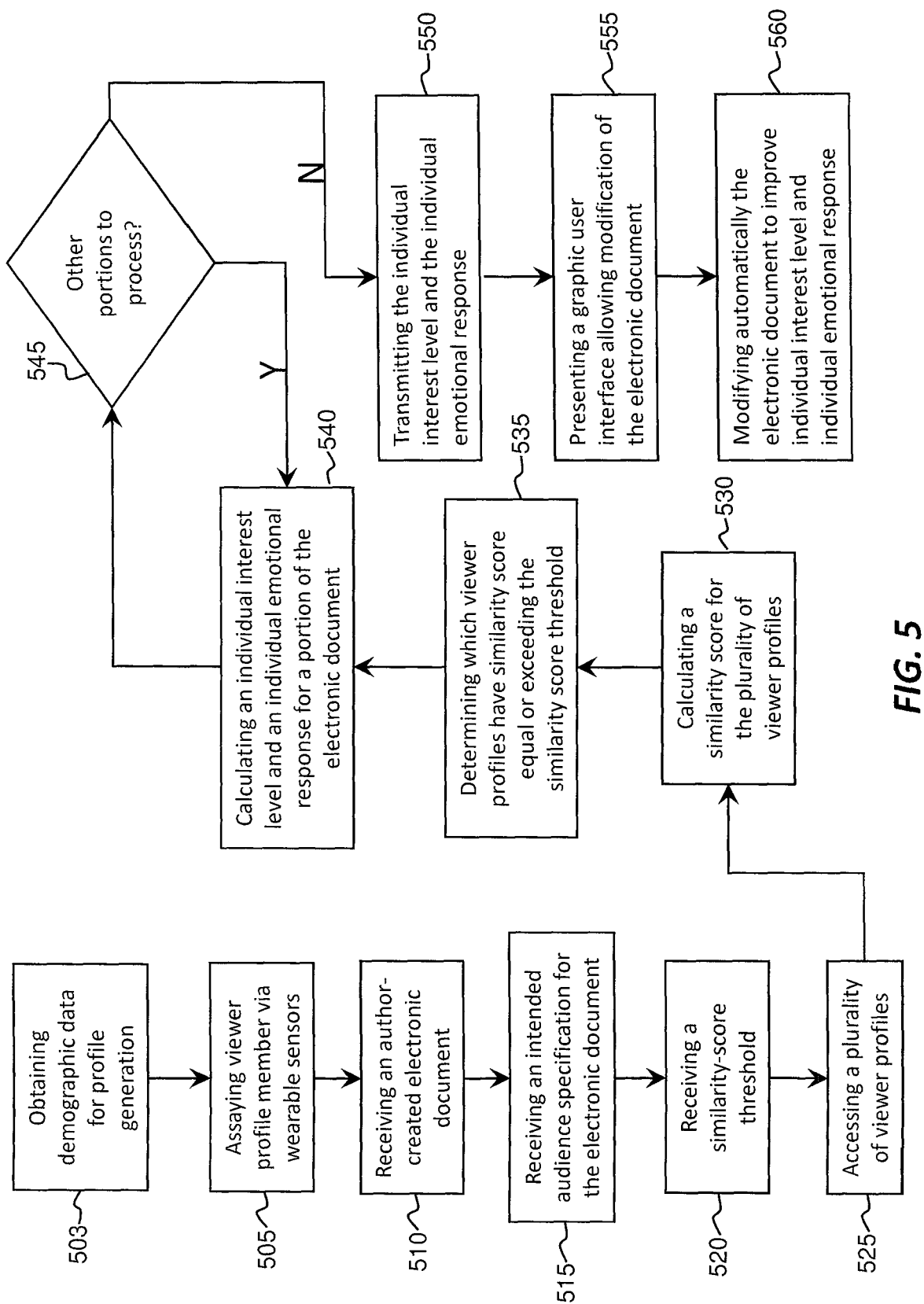
FIG. 5 is a flowchart depicting operational steps that a hardware component of a hardware appliance may execute, in accordance with an embodiment of the invention.

FIG. 5 is a flowchart depicting operational steps that a hardware component, multiple hardware components, and/or a hardware appliance may execute, in accordance with an embodiment of the invention. At step 503, optionally, demographic data is obtained for profile generation from demographic data storage 142 of viewer profile database 140. At step 505, again optionally, a viewer profile member assay is performed via wearable sensors 150 by viewer profile generator 121 accessing the sensor interface module 152. Alternately, an electronic or other type of survey may be presented for completion by individuals for profile generation. At step 510, an author-created electronic document is received from the real-time electronic document creator 112 for obtaining of predictive feedback from the user computer 110. Alternately, only a portion of the electronic documents is received. At step 515 an intended audience specification is received for the electronic document from real-time electronic document creator 112 of user computer 110. At step 520 the similarity score threshold is also received by the server 120 from real-time electronic document creator 112 of user computer 110. At step 525 a plurality of viewer profiles are accessed from viewer profile storage 146 of the viewer profile database 140 by the database interface module 124. At step 530, similarity scores are calculated by the similarity score calculator 126 of server 120 for the plurality of viewer profiles. At step 535 the similarity score calculator 126 of the server 120 determines which viewer profiles have similarity scores equal or exceeding the similarity score threshold. At step 540 a portion of the electronic document is analyzed by the electronic document analysis module of server 120, and an individual interest level and an individual emotional response to the portion of the electronic is calculated. At step 545 a determination is then made whether there are more portions of the electronic document to process, such as if the author was continuously to add to the electronic document in real-time. If yes, execution returns to 540 and another portion of the electronic document is analyzed to calculate individual interest level and individual emotional response. Once there are no more portions of the electronic document to process, execution proceeds to 550 where individual interest level(s) and individual emotional response(s) are transmitted by the results transmitter module 128 to the results receiver module 116. In a further embodiment, at step 555 the server 120 presents a graphic user interface to the user computer 110 allowing automated modification of the electronic document, such as by providing suggestions for removing or replacing offensive words, or presenting suggested points in video, audio, or multimedia electronic documents to obscure offensive language or other content. Alternately, at step 560 the server 120 automatically modifies the electronic document by changing words, "bleeping" out content, obscuring or removing violence or suggestive content, etc. In any case, the end results of steps 550, 555, and 560 is improvement to individual interest level and individual emotional response to the electronic document.

Figure 6:
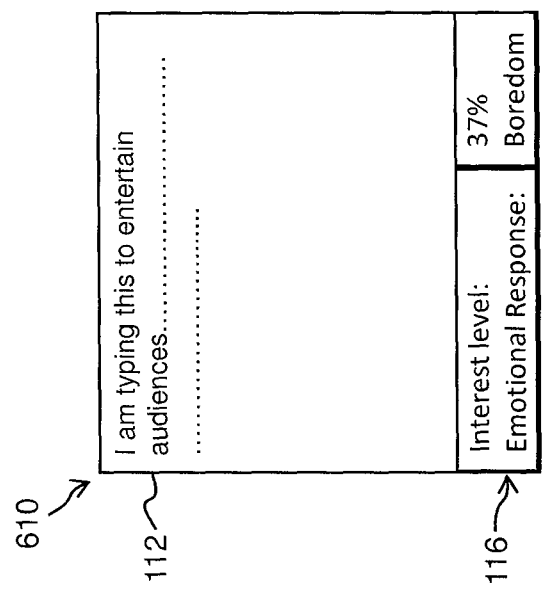
FIG. 6 is a simulated graphic user interface, providing access to a real-time electronic document creator module and a results receiver module, in accordance with an embodiment of the invention.

FIG. 6 is a simulated graphic user interface 610 providing access to a real-time electronic document creator module 112 and the results receiver module 116, in accordance with an embodiment of the invention. The graphic user interface 610 is accessed at the user computer 110. The real-time electronic document creator 112 seamlessly transmits a sentence typed in this text-style document. The results received module 116 returns predictive audience feedback regarding the transmitted sentence within the graphic user interface. The audience is not particularly interested, and appears bored 116.

Figure 7:
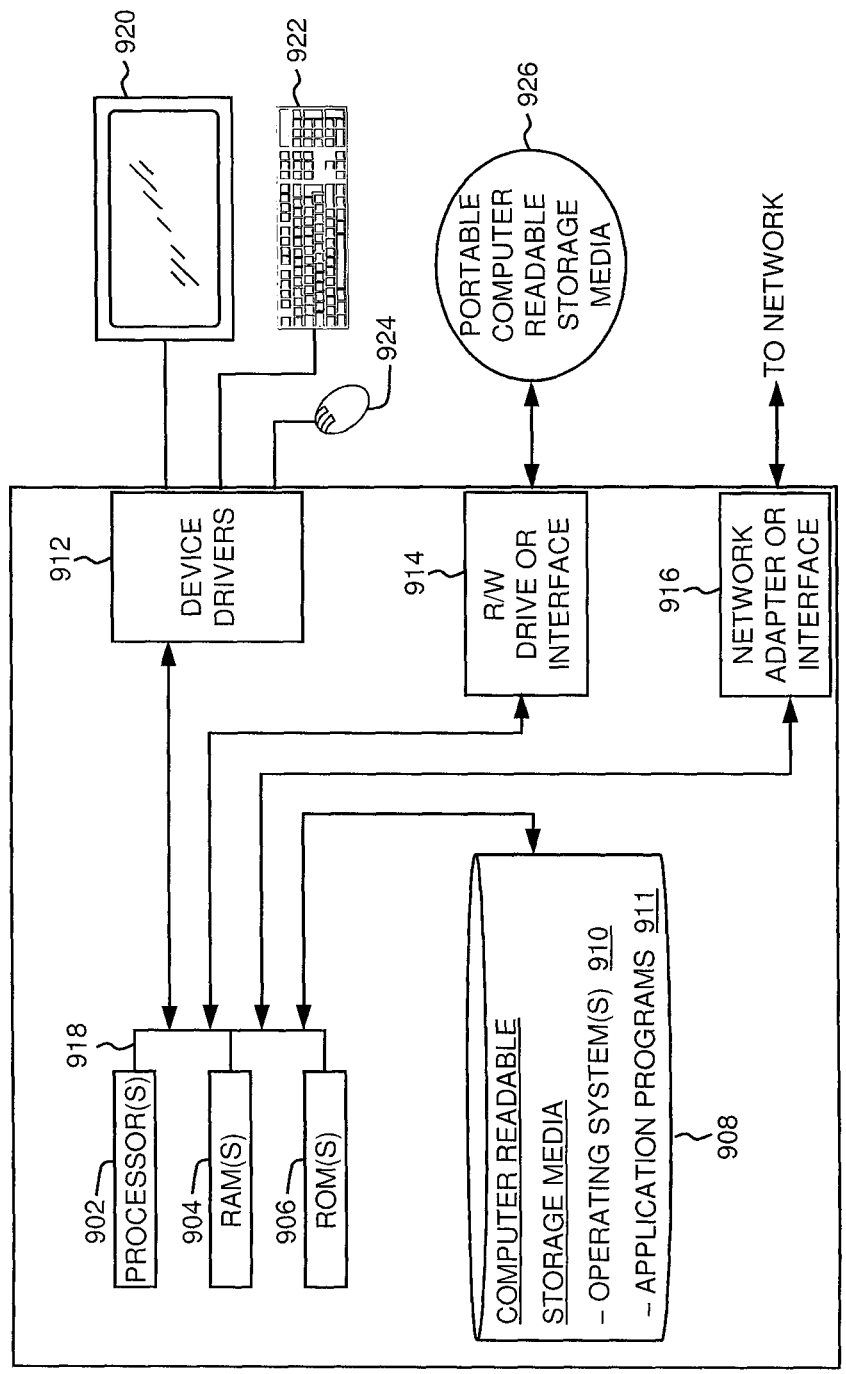
FIG. 7 depicts a block diagram of components of user computer and/or server of FIG. 1, in accordance with an embodiment of the present invention.

FIG. 7 depicts a block diagram of components of user computer 110 and/or server 120 of the environment for real-time analysis of predictive audience feedback during content creation 100 of FIG. 1, in accordance with an embodiment of the present invention. It should be appreciated that FIG. 7 provides only an illustration of one implementation and does not imply any limitations with regard to the environments in which different embodiments may be implemented. Many modifications to the depicted environment may be made.

User computer 110 and/or server 120 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, for example, a presentation program as embodied in an implementation according to the exemplary embodiments, are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

User computer 110 and/or server 120 may also include a R/W drive or interface 914 to read from and write to one or more portable computer readable storage media 926. Application programs 911 on the user computer 110 and/or server 120 may be stored on one or more of the portable computer readable storage media 926, read via the respective R/W drive or interface 914 and loaded into the respective computer readable storage media 908.

User computer 110 and/or server 120 may also include a network adapter or interface 916, such as a TCP/IP adapter card or wireless communication adapter (such as a 4G wireless communication adapter using OFDMA technology). Application programs 911 on User computer 110 and/or server 120 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

User computer 110 and/or server 120 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a method, system, and/or computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, computer program products, and apparatus (systems) according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of method, system, and computer program product according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
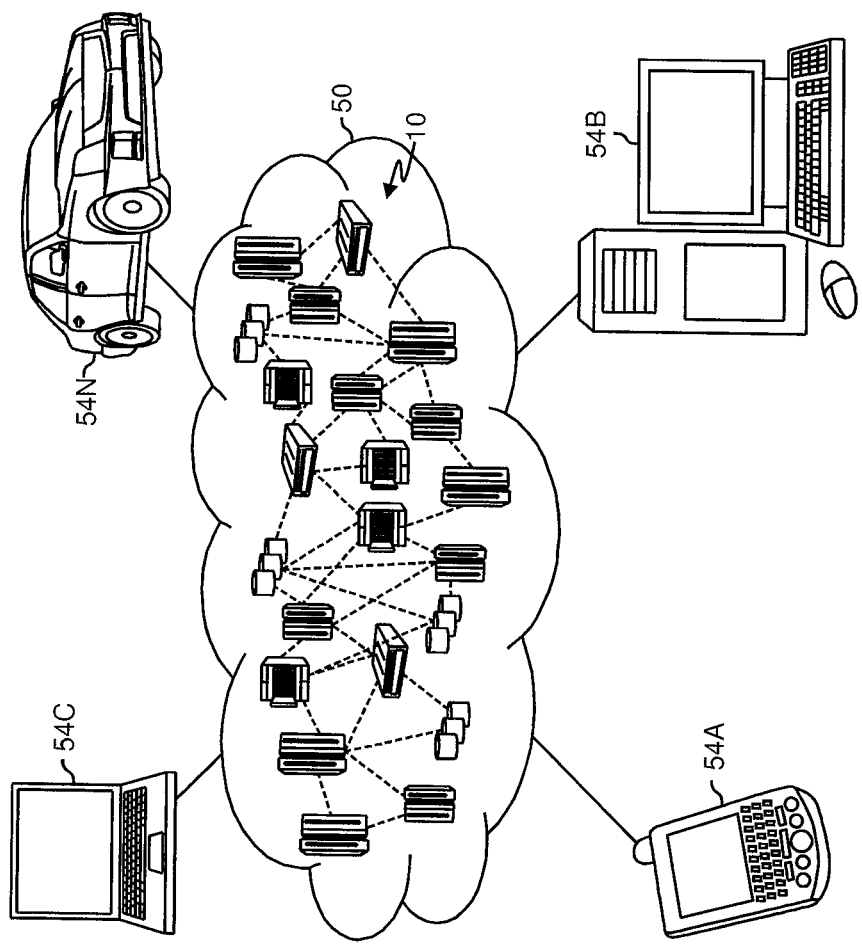
FIG. 8 depicts a cloud computing environment, in accordance with an embodiment of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
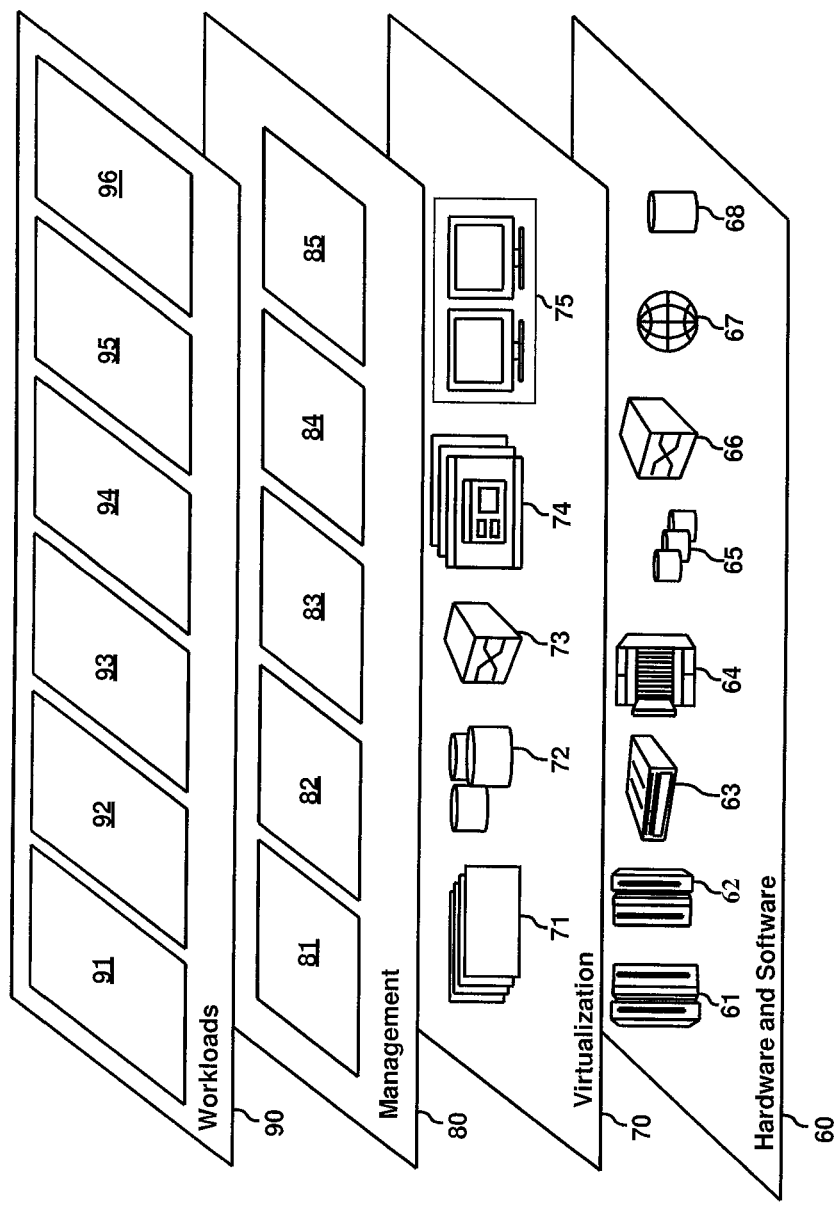
FIG. 9 depicts abstraction model layers, in accordance with an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and the environment for real-time analysis of predictive audience feedback during content creation 96.

Based on the foregoing, a method, system, and computer program product have been disclosed. However, numerous modifications and substitutions can be made without deviating from the scope of the present invention. Therefore, the present invention has been disclosed by way of example and not limitation.

What is claimed is:

1. A computer program product for providing predictive feedback during content creation in real-time, the computer product comprising:
one or more non-transitory computer-readable storage media and program instructions stored on the one or more non-transitory computer-readable storage media, the program instructions, when executed by a computer, cause the computer to perform a method comprising:
receiving, by a server computer from a user-computing device, an electronic document during creation of the electronic document in real-time;
receiving, by the server computer, an intended audience specification for the received electronic document, the intended audience specification comprising a series of first values to select characteristics of an audience of the electronic document;

receiving, by the server computer from the user-computing device, a similarity score threshold, the similarity score threshold comprising a second value indicating a similarity to the intended audience specification;

determining, by the server computer, first viewer profiles from a plurality of viewer profiles corresponding to the intended audience specification;

calculating, by the server computer, a similarity score for the first viewer profiles;

determining, by the server computer, second viewer profiles which are selected from the first viewer profiles having the similarity score equal to or exceeding the similarity score threshold and storing the second viewer profiles;

calculating an individual interest level and an individual emotional response of the second viewer profiles for a portion of the received electronic document;

transmitting, by the server computer to the user-computing device, the individual interest level and the individual emotional response of the second viewer profiles; and modifying automatically the portion of the received electronic document to improve the individual interest level and the individual emotional response.

2. The computer program product of claim 1, wherein the server computer transmits the individual interest level and the individual emotional response of the second viewer profiles by presentation of a graphic user interface on the user-computing device.

3. The computer program product of claim 1, wherein the server computer automatically modifies the portion of the received electronic document to improve individual interest level and individual emotional response following transmission of the individual interest level and the individual emotional response of the second viewer profiles.

4. The computer program product of claim 1, wherein the electronic document is selected from a group consisting of a text file, a video file, and an audio file.

5. The computer program product of claim 4, wherein if the electronic document is the video file or the audio file, the portion of the received document analyzed is a segment of the video file or the audio file.

6. The computer program product of claim 1, wherein the similarity score threshold is calculated within a range of 0.0 to 1.0.

7. The computer program product of claim 1, wherein the viewer profiles are generated via an obtaining of demographic data and a viewer profile member assay via each viewer wearing one or more wearable sensors while consuming sample digital content.

8. A computer system for providing predictive feedback during content creation in real-time, the computer system comprising:

one or more computer processors, one or more computer-readable storage media, and program instructions stored on one or more of the computer-readable storage media for execution by at least one of the one or more processors, the program instructions, when executed by a computer, cause the computer to perform a method comprising:

receiving, by a server computer from a user-computing device, an electronic document during creation of the electronic document in real-time;

receiving, by the server computer, an intended audience specification for the received electronic document, the intended audience specification comprising a series of first values to select characteristics of an audience of the electronic document;

receiving, by the server computer from the user-computing device, a similarity score threshold, the similarity score threshold comprising a second value indicating a similarity to the intended audience specification;

determining, by the server computer, first viewer profiles from a plurality of viewer profiles corresponding to the intended audience specification;

calculating, by the server computer, a similarity score for the first viewer profiles;

determining, by the server computer, second viewer profiles which are selected from the first viewer profiles having the similarity score equal to or exceeding the similarity score threshold and storing the second viewer profiles;

calculating an individual interest level and an individual emotional response of the second viewer profiles for a portion of the received electronic document;

transmitting, by the server computer to the user-computing device, the individual interest level and the individual emotional response of the second viewer profiles; and modifying automatically the portion of the received electronic document to improve the individual interest level and the individual emotional response.

9. The computer system of claim 8, wherein the server computer transmits the individual interest level and the individual emotional response of the second viewer profiles by presentation of a graphic user interface on the user-computing device.

10. The computer system of claim 8, wherein the server computer automatically modifies the portion of the received electronic document to improve individual interest level and individual emotional response following transmission of the individual interest level and the individual emotional response of the determined viewer profiles.

11. The computer system of claim 8, wherein the electronic document is selected from a group consisting of a text file, a video file, and an audio file.

12. The computer system of claim 11, wherein if the electronic document is the text file, the portion of the electronic document analyzed by the server is selected from a group consisting of a sentence of the text file, a paragraph of the text file, and a page of the text file.

13. The computer system of claim 8, wherein the viewer profiles are generated via an obtaining of demographic data and a viewer profile member assay via each viewer wearing one or more wearable sensors while consuming sample digital content.

* * * * *